May 16, 1967 — E. W. HOWLAND — 3,320,412
AIRCRAFT INSTRUMENT ILLUMINATION
Filed March 4, 1965
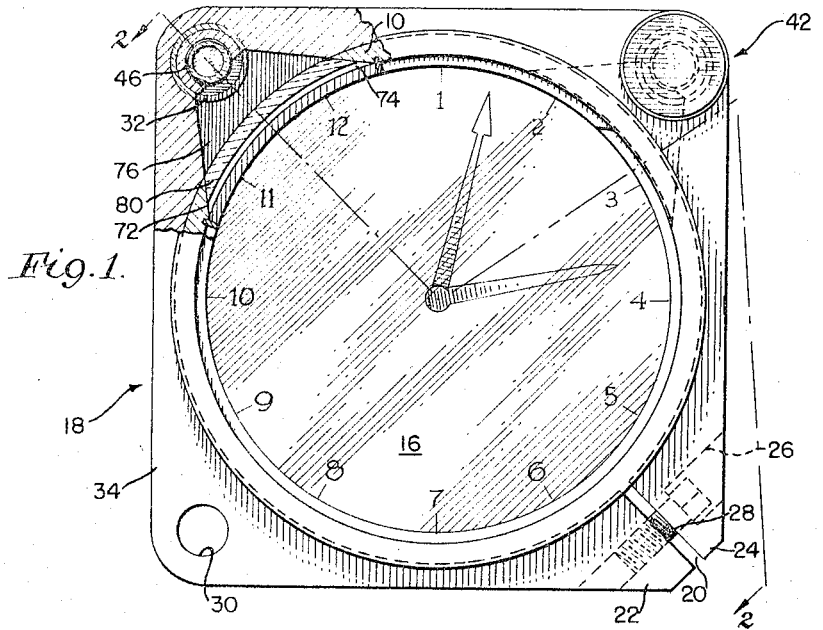
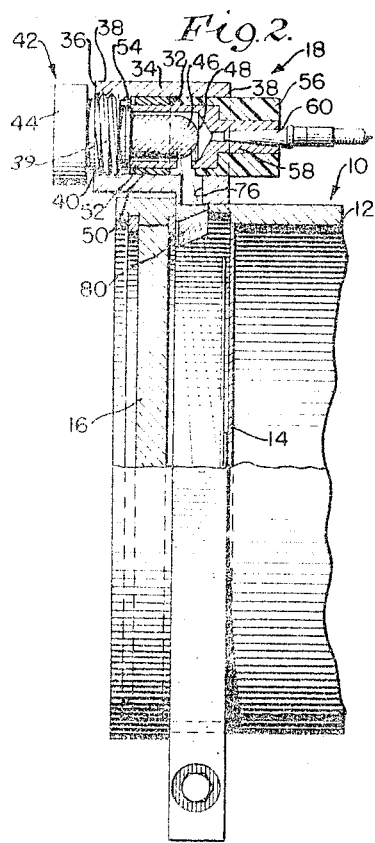
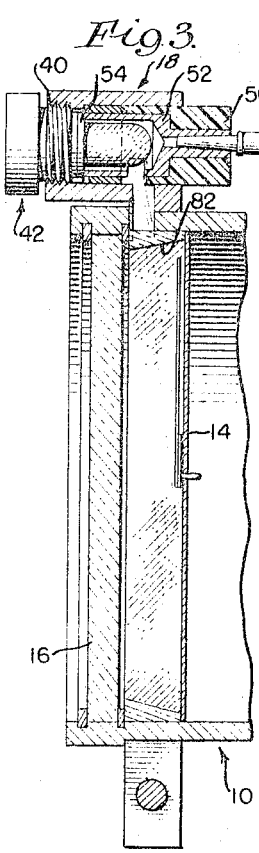
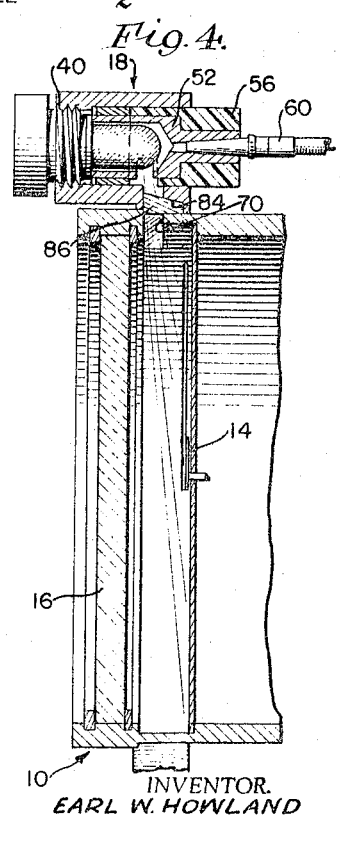
INVENTOR.
EARL W. HOWLAND
BY
Bean, Brooks, Buckley & Bean
ATTORNEYS

United States Patent Office 3,320,412
Patented May 16, 1967

3,320,412
AIRCRAFT INSTRUMENT ILLUMINATION
Earl W. Howland, 1540 Elmwood Ave.,
Buffalo, N.Y. 14207
Filed Mar. 4, 1965, Ser. No. 437,186
5 Claims. (Cl. 240—2.1)

This invention relates in general to aircraft instruments and pertains, more particularly, to means whereby illumination of such instruments is materially enhanced.

Preferably, aircraft instruments are not provided with individual means for illumination, but receive illumination from external source or sources. As a result, the illumination of the dials of the instruments leaves something to be desired and in many instances, the instruments are read only with great difficulty. It would, therefore, be of great advantage to provide individual illuminating means for each of the instruments in an aircraft instrument panel. However, due to the crowded nature of instruments on such a panel, individual illumination of the instruments by ordinary means becomes impractical since there is insufficient room in which to mount the various individual illuminating means. It is, accordingly, of primary concern in connection with the present invention to provide an illuminating means for aircraft instruments in which each instrument may be provided with individual illuminating means which is, at the same time, of sufficiently small size as to permit the installation and wherein, at the same time, the illuminating means is capable of functioning also as a mounting means for the instrument.

Another object of this invention is to provide an improved illuminating means for aircraft instruments which is entirely separate and independent of the body of the instrument and which, therefore, can be readily adapted for application to an existing instrument.

More specifically, the present invention relates to an individual illuminating means for aircraft instruments which takes the form of a clamp which may be detachably fastened to the body of an instrument and which is of no greater size than the original mounting plate for the instrument so that the illuminating means will not interfere with normal mounting of the instrument.

Other objects and advantages of the invention will appear from the description hereinbelow and the accompanying drawing wherein:

FIG. 1 is a front elevational view of an aircraft instrument fitted with an illuminating means constructed in accordance with the present invention, a portion of the illuminating means being broken away to show details of th internal arrangement thereof;

FIG. 2 is a sectional view taken substantially along the plane of section line 2—2 in FIG. 1 illustrating details of one form of the invention;

FIG. 3 is a sectional view taken diametrically through FIG. 1 and showing a modified form of the invention; and FIG. 4 is a view similar to FIG. 3 but showing a still further modified form of the invention.

Referring now more particularly to FIGS. 1 and 2, the reference character 10 therein indicates generally the body of an aircraft instrument, of any desired type or arrangement, the body being of cylindrical configuration exteriorly thereof and being provided with a hollow interior 12 receiving the operating parts of the instrument, not shown. The instrument is provided with a dial 14 having the proper calibrations or indicia thereon and disposed within the open end of the body 10 in spaced parallelism with the dial 14 is a cover glass 16 for protecting the dial 14 and sealing the assembly against the entrance of foreign material, dirt and the like.

The mounting flange clamp according to the present invention is indicated generally by the reference character 18 and will be seen to consist of a generally annular body which is split as at 20 to present the spaced ear portions 22 and 24 thereof. The ear 24 is provided with a bore and a counterbore 26 whereas the other ear 22 is provided with a threaded opening, the two cooperating to receive the bolt member 28 to urge the ears together and clamp the flange assembly 18 onto the body of the instrument, as will be understood. The external contour of the assembly 18 is such as to accommodate for proper mounting of the instrument body 10, being substantially square in the specific embodiment shown in FIG. 1 and the attachment may be provided with one or more openings such as the opening 30 whereby the instrument together with the mounting flange clamp thereto may be rigidly fastened to an aircraft instrument panel. It will be understood that the aircraft instrument is of entirely conventional construction and that its body 10 may have originally been provided with a suitable mounting flange integral therewith and which is of profile or contour substantially identical with the attachment 18 shown in FIG. 1. To accommodate such a conventional aircraft instrument for use in connection with the present invention, the conventional mounting flange portion thereof is machined off and replaced with the instant mechanism 18.

As is shown more particularly in FIG. 2, the mounting flange assembly 18 is provided with a recess 32 which extends completely to the flange portion 34 from the front side 36 thereof to the rear side 38 thereof. At the front side, the recess is provided with screwthreads 39 which receives the threaded shoulder portion 40 of a light source indicated generally by reference character 42. The light source 42 is provided with an external knob portion 44 whereby the same may be easily threaded into and out of the recess 32, and a bulb portion 46 containing a filament adjacent the tip or free end portion 48 of the bulb. The recess 32 receives an insulating bushing or sleeve 50 which isolates the metallic contact member 52 from the metallic body 34 of the flange. The tubular portion of the contact member 52 engages endwise against the contact portion 54 of the light source 42 and this contact member 52, being metal is insulated also from the body 34 by a further dielectric adapter member 56. The electrical contact member 52 is provided with a projecting stem portion 58 provided with a tapered opening as shown for receiving a tapered electrical conductor end 60, substantially as is shown. From the aforesaid, it will be readily appreciated that the electrical contact member 52 engaging the contact portion 54 of the light source, supplies current thereto and the return path is provided through the ground effected at the screwthreads 39. Such light sources are entirely conventional in the art.

As is shown in FIG. 1, there may be a plurality of light sources disposed in circumferentially spaced relationship to each other relative to the instrument dial portion 14 and, in each instance, the body 10 is provided with a relatively wide slot, such as the slot indicated generally by the reference character 70 in FIG. 4, the end portions of which are indicated by reference characters 72 and 74 in FIG. 1. At the same time, the mounting flange 34 is provided with a slot 76 which is aligned with the slot 70 in each case and it will be noted that the opposite sides of the slot as shown in FIG. 1 are disposed in tapered inward relationship to each other with the slot 76 extending into intersection with the recess 32 in the flange member 34.

In the particular form of the invention shown in FIG. 1, the slot in the body 10 receives a prismatic segment indicated by the reference character 80, it being appreciated that the slots 70 and 76 are so oriented as to be disposed relative to the filament of the light source 42 such that light passes through the slots in the manner indicated in FIG. 2 so as to intersect the prism segment 80 and spread the light over the surface of the dial 14. The prism segment 80 is preferably cemented in place within the confines of the body 10 and a similar manner of fastening may prevail for the adapter plug member 56.

In another embodiment of the invention, as shown in FIG. 3, the flange member 18 and the body 10 are provided with the aligned slots as disclosed hereinabove but, in this case, a prismatic ring 82 is disposed interiorly of the body 10 between the cover glass 16 and the dial 14 thereof, substantially as is shown. The manner of operation is identical insofar as the lighting effect is concerned with the arrangement shown in FIG. 2.

A further modification of the invention involves the provision of the slots 70 and 76 in the body 10 and the member 18 respectively but, additionally, the member 18 is provided with a recess or recesses 84 receiving prism segments 86 which cover the extents of the slots provided, substantially as is shown.

In any case, it will be manifest that the assembly according to the present invention is easily and readily adapted for use in conjunction with an aircraft instrument, it being merely necessary to clamp the assembly 18 in place on the body 10. The slots in the body and the mounting assembly 18 are disposed in alignment and the desired prismatic element is utilized in conjunction therewith to provide the proper individual lighting effect. The light sources are accessible exteriorly and do not require removal of the instrument for replacement thereof while, at the same time, the assembly 18 is of such dimensions as does not interfere with the normal mounting of the instrument so that the pattern or arrangement of instruments on the instrument panel need not be disturbed and may remain within the required specifications therefor.

It is to be understood that certain changes and modifications as illustrated and described may be made without departing from the spirit of the invention or the scope of the following claims.

I claim:
1. An aircraft instrument comprising, in combination, a tubular body having an open end,
an instrument dial disposed within said body adjacent to but spaced from said open end thereof,
a cover glass disposed within said body in spaced relation to said dial and closing said open end of the body,
said body having a slot therethrough extending between the inner and the outer surfaces thereof within the region between said cover glass and instrument dial,
a mounting flange having an inner surface embracing said outer surface of the body and covering said slot in the body, said flange projecting radially of the body and having means associated therewith for mounting the instrument upon a panel,
means for detachably securing said mounting flange on said body,
said mounting flange having a recess therein, and a light source in said recess, said mounting flange also having a slot extending from said recess to its inner surface, the slots in said mounting flange and said body being in registry,
and prism means for spreading light passing through said slots over the face of said dial.
2. In the assembly as defined in claim 1 wherein said prism means is received within said body between said cover glass and said dial.
3. In the assembly as defined in claim 1 wherein said prism means is disposed within said slot in the body.
4. In the assembly as defined in claim 1 wherein said prism means is disposed within said slot in said flange member.
5. The instrument as defined in claim 1 wherein said open end of the body is provided with a shoulder, said mounting flange abutting said shoulder to establish registry between said slots.

References Cited by the Examiner
UNITED STATES PATENTS

| | | | |
|---|---|---|---|
| 1,361,151 | 12/1920 | Goetting | 240—41.55 |
| 2,202,142 | 5/1940 | Carter | 240—2.1 |
| 2,227,368 | 12/1940 | Rylsky | 240—2.1 |
| 2,259,910 | 10/1941 | Rylsky | 240—2.1 |
| 2,262,920 | 11/1941 | Carbonara | 240—2.1 |
| 2,290,284 | 7/1942 | Klein et al. | 240—2.1 |

NORTON ANSHER, *Primary Examiner.*

JOHN M. HORAN, *Examiner.*

R. M. SHEER, *Assistant Examiner.*